United States Patent [19]

Meyer et al.

[11] Patent Number: 5,144,674
[45] Date of Patent: Sep. 1, 1992

[54] DIGITAL PROGRAMMING DEVICE FOR HEARING AIDS

[75] Inventors: Wolfram Meyer, Moehrendorf; Eduard Kaiser, Forchheim; Ullrich Sigwanz, Erlangen, all of Fed. Rep. of Germany; Soeren Larsen, Odense, Denmark

[73] Assignee: Siemens Aktiengesellschaft, Munich, Fed. Rep. of Germany

[21] Appl. No.: 420,934

[22] Filed: Oct. 13, 1989

[30] Foreign Application Priority Data

Oct. 13, 1988 [DE] Fed. Rep. of Germany ....... 3834962

[51] Int. Cl.$^5$ ...................... H04R 29/00; H04R 25/00
[52] U.S. Cl. ........................................ 381/68; 381/58; 381/60; 381/68.2; 381/68.4
[58] Field of Search ................ 128/746; 364/406, 408, 364/481, 483; 379/96; 381/58, 60, 68, 68.2, 68.4, 52, 61

[56] References Cited

U.S. PATENT DOCUMENTS

| | | | |
|---|---|---|---|
| 4,065,647 | 12/1977 | Frye et al. | 381/60 |
| 4,481,661 | 11/1984 | Spector | 381/61 |
| 4,736,327 | 4/1988 | Power | 364/481 |
| 4,759,070 | 7/1988 | Voroba et al. | 381/60 |
| 4,768,165 | 8/1988 | Hohn | 381/68.2 |
| 4,879,749 | 11/1989 | Levitt et al. | 381/68.4 |
| 4,947,433 | 8/1990 | Gebert | 381/68 |
| 4,961,142 | 10/1990 | Elliott et al. | 364/408 |
| 4,989,251 | 1/1991 | Mangold | 381/68.2 |
| 4,991,105 | 2/1991 | Pimental | 364/483 |
| 4,992,966 | 2/1991 | Widin et al. | 364/57.04 |
| 5,007,090 | 4/1991 | Bransky et al. | 381/60 |

FOREIGN PATENT DOCUMENTS

| | | |
|---|---|---|
| 0163775 | 12/1984 | European Pat. Off. |
| 0180428 | 10/1985 | European Pat. Off. |
| 0180428 | 5/1986 | European Pat. Off. |
| 2844218 | 4/1980 | Fed. Rep. of Germany ........ 381/60 |

OTHER PUBLICATIONS

"The Meaning of Digital Technology", Widin, Hearing Instruments vol. 38, No. 11, Nov. 1987, pp. 28, 30, 32, 33 and 74.
Product Brochure for PHOX Programming Device of Micro-Technik GmbH.
Radio Shack Catalog #446 Copyright 1989 pp. 164–165.
Pluvinage and Benson, "New Dimensions in Diagnostics and Fitting", Hearing Instruments, Aug. 1988.
Widex Hearing Aid Company Inc., "Quattro", Apr. 1989.
Johnson, Pluvinage and Benson, "Digitally Programmable Full Dynamic Range Compression Technology "Oct. 1989.
Resound Incorporated, "The Resound Digital Hearing System" Aug. 1989.
Audio Engineering Society "Draft of AES Recommended Standard for Sound Reinforcement Systems Communications Interface".

Primary Examiner—James L. Dwyer
Assistant Examiner—William D. Cumming
Attorney, Agent, or Firm—Hill, Van Santen, Steadman & Simpson

[57] ABSTRACT

Digitally programmable, single-channel and multi-channel hearing aids of various manufacturers and/or hearing aids having different acoustic characteristics can be set and adjusted with the programming device of the invention. The programming device includes a microcontroller, main memories, interchangeable company program modules with plug-in locations, and a master program module with corresponding plug location. A display is also provided for the programming device.

10 Claims, 5 Drawing Sheets

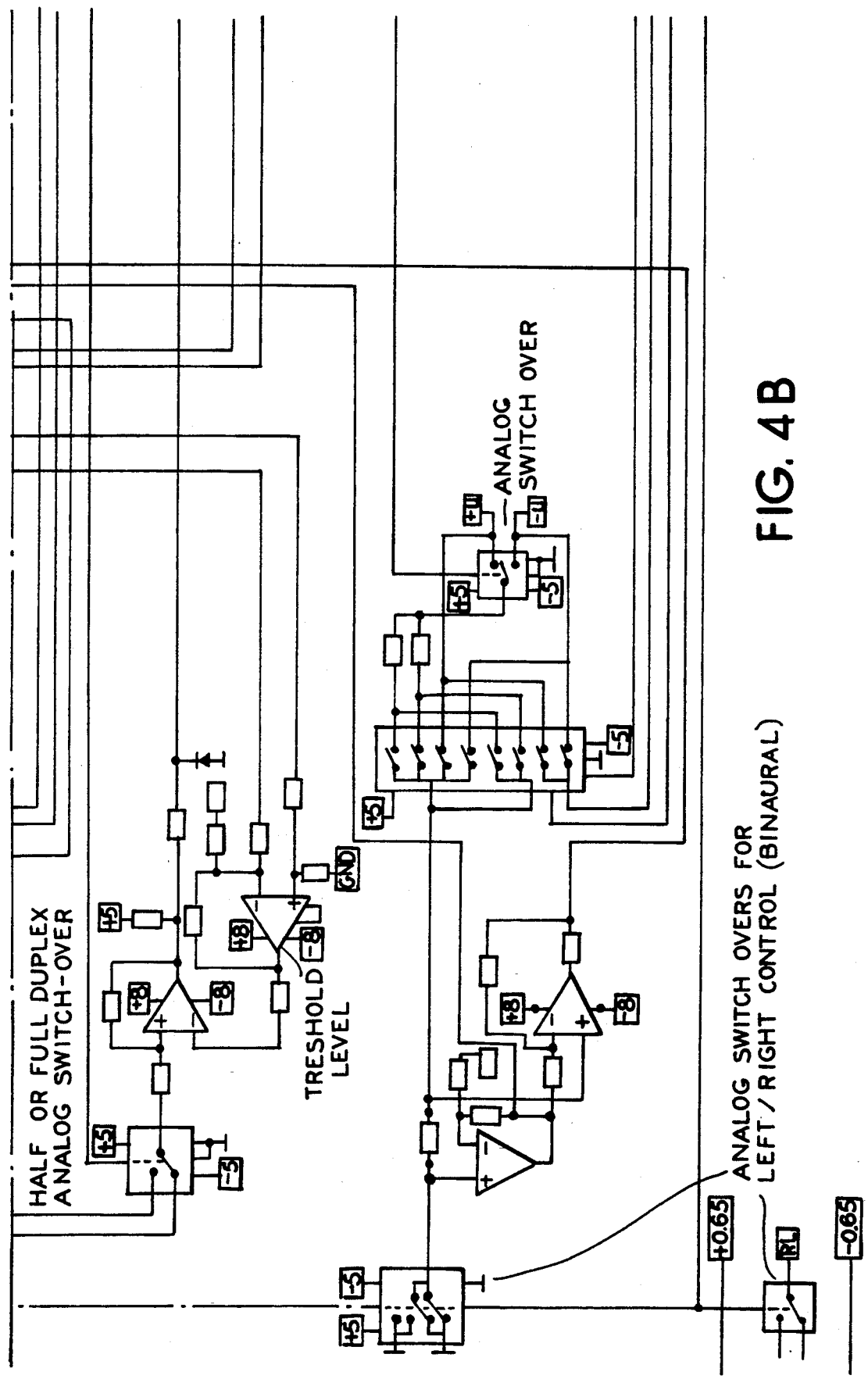

DIGITAL PROGRAMMING DEVICE FOR HEARING AIDS

BACKGROUND OF THE INVENTION

1. Field of the Invention

The invention relates generally to a programming device for digitally programmable hearing aids.

2. Description of the Prior Art

Known programming devices of this type, such as the programming device PHOX of Micro-Technik GmbH, Stuttgart, Federal Republic of Germany, can be used only for programming the hearing aids with specific acoustic properties of a specific manufacturer. A hearing aid acoustician, who would like to offer various hearing aids of a number of manufacturers, would require a number of programming devices to accommodate this assortment of hearing aids. This is not possible, however, due to the high cost of such programming devices.

SUMMARY OF THE INVENTION

An object of the invention is to provide a programming device with which digitally programmable, single-channel and multi-channel hearing aids of various manufacturers and/or hearing aids having different acoustic characteristics can be adjusted.

This object is achieved according to the principles of the present invention with a programming device having a microcontroller having periphery circuit packages and a main memory as well as a number of plug-in locations for the acceptance of interchangeable company program modules (storage cassettes). The compatibility between the programming device and the various hearing aids to be programmed can be produced with the company program modules so the characteristics (function features, electro-acoustic hearing aid data, fitting data, operating sequence, calculating algorithms, etc.) of the hearing aid to be programmed are stored in every company program module. An additional plug-in location is provided for a master program module such that the master program module is selected when the programming device is turned on. A read event of the company program modules, via the master program module, makes it possible to identify whether a plug-in location is occupied or not occupied and what company program modules are present in the plug-in locations.

It is provided in the preferred embodiment that the manufacture and/or the type of the hearing aid to be programmed is shown at a display.

For simpler operation of the programming device, it is also possible to show the operating sequence for the plugged-in company program module at the display.

The interface between programming device and hearing aid is distinguished in that software programming of the present invention makes it adaptable to broad ranges (signal level, signal direction, signal impedance, half-duplex and full-duplex adjustment) of different hearing aid interfaces as can occur from connection to different hearing aids.

As an object of the invention is suggested that the hearing aid interface consists of a software-controlled digital-to-analog converter in order to produce variable signal levels, and a software-controlled analog-to-digital converter in order to determine external impedance, and a software-controlled analog switch-over in order to adjust the half- or full-duplex mode, and software-controlled analog switches in order to connect or disconnect different pull-up or pull-down resistors, and hardware-controlled operation amplifiers using an external resistor in order to produce variable signal levels and polarities.

DESCRIPTION OF THE DRAWINGS

FIG. 4A and 4B (which are to be read in combination) are a circuit schematic for an embodiment of the invention including, inter alia, half- or full-duplex mode adjustment and other switchable components.

DETAILED DESCRIPTION OF THE PREFERRED EMBODIMENTS

Digitally programmable hearing aids (behind-the-ear and in-the-ear hearing aids) of different manufacturers can be adjusted with the programming device of the invention. The hearing aid acoustician, as a result, utilizes only one programming device for uniform operation. As in FIG. 1, the programming device is equipped with a microcontroller 1 which creates the prerequisite for programming all single-channel and multi-channel, digitally programmable hearing aids that are registered in the program modules. The compatibility of the programming device with the various hearing aids provided therefore is produced by interchangeable company program modules for $4a-4n$. New generations of digitally programmable, single-channel and multi-channel hearing aids can thus also be matched to the system of the programming device at any time by updating the manufacturer-specific company program modules. The programming of the hearing aids can therefore occur based on a uniform operating scheme. For example, five manufacturer-specific company program modules can be simultaneously plugged in and be driven via the master program module. Based on the possibility of interchanging the pluggable company program modules as well as the master program module, the programming device is now already prepared for future generations of digitally programmable hearing aids of various manufacturers.

Nine different basic settings are available, for example, for the pre-selection in the fitting. For example, the hearing aid acoustician can add nine more individual settings to these basic settings according to his individual requirements. For example, 15 additional memory locations can be selected for the immediate comparison of different settings produced during the fitting phase. The hearing aid acoustician can thus offer his customers a number of different hearing aid settings for fine-tuned adaptation and can then permanently store the optimum adjustment in the hearing aid. The hearing aid can remain on the head of the hearing-impaired person during the entire adjustment process. Two serial RS 232-interfaces are available for transfer of the data with a personal computer 19 and a printer 18. Thus, in a preferred embodiment of the invention, up to 15 different hearing aid adjustments can be intermediately stored by the hearing aid acoustician during the course of a fitting process and can be available to the test subject for a fast acoustic comparison. As a result of this speech comprehensibility and timbre at two different settings, respectively, can already be subjectively compared and evaluated during a short sentence. An additional memory of the programming device contains nine different basic settings which the hearing aid acoustician can access at any time. Nine individual parameters can also be set at the discretion of the hearing aid acoustician.

Figure 2:
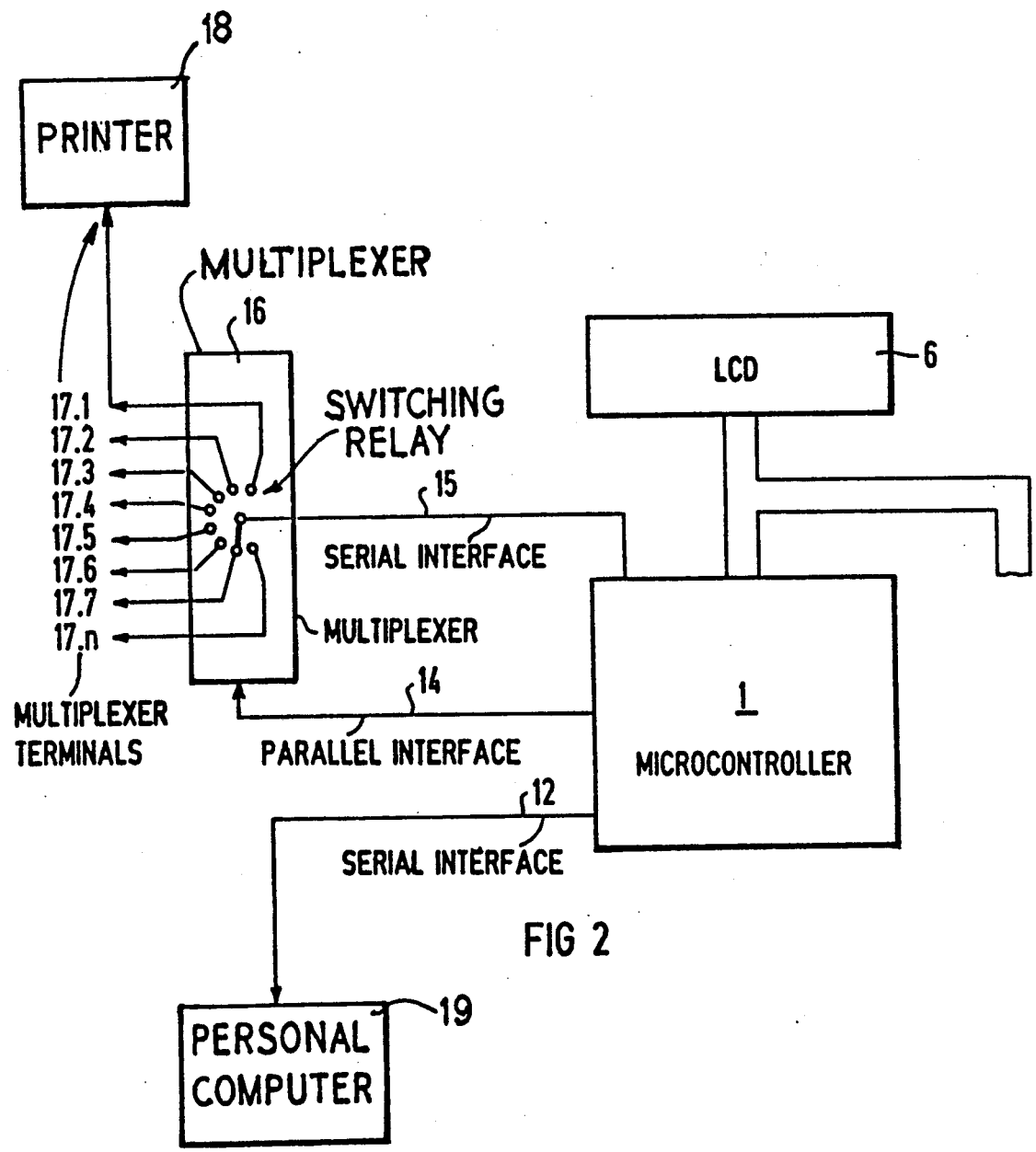
FIG. 2 is a portion of FIG. 1 with an interface multiplexer.

According to FIG. 2, additional periphery devices can be connected via a multiplexer 16 which is connected to the programming device of the invention in a simple and cost-saving way via a parallel interface 14 and via a serial interface 15. The multiplexer 16 has terminals 17.1 through 17.n. A separate intelligent control unit is not required in the multiplexer since the control of the multiplexer 16 is via a parallel interface 14, such as a Centronics interface. Up to 256 connections can be realized with eight lines of a parallel interface. In practice, therefore, the number of lines of the parallel interface 14 can usually be reduced at the programming device. The multiplexer 16 can be realized with relays for switching the serial interface 15, thus making level problems easier to solve. Alternatively, the multiplexer 16 can be connected to the interface 12 designed as a serial interface, as a result, the serial interface 15 can be omitted. A peripheral personal computer 18 can then be connected, for example, to the terminal 17.1, while other peripheral equipment can be connected to the terminals 17.2 through 17.n.

The microcontroller-controlled programming device of the invention with its manufacture-specific company program modules 4a–4n (FIG. 1) controls and coordinates internal function executions, stores data and only allows correct parameter settings. A company program module contains hearing aid specific programs of a hearing aid manufacture that are necessary for the programming and for the data dialogue of his hearing aids. All parameter values are displayed in surveyable fashion on, for example, large graphic liquid crystal display 6. The fitting process can be considerably facilitated by a supporting text and the graphic imaging of the transmission characteristic.

A surveyable and performance-reliable operation of the programming device is achieved for the user by ergonomic arrangement of the keyboard 13 and its labels. Logically related function executions are called in and executed by pressing keys. The number of keys is preferably limited to the essential functions. Practice-relation, easy learnability, as well as clarity are the basis for the uniform operating scheme. When pressing a function key (read), all parameter values of the connected hearing aid are directly transferred onto the display 6. Parameter settings can be modified, the storing of complete device settings (store) as well as the recall of these device settings can be carried out with additional function keys. Subsequently, individual, new parameter values or a complete parameter set can be stored in the hearing aid with one key (Prog).

In a preferred embodiment, the master program module 5 is always selected when the programming device is switched on. This master program module 5 can utilize the whole address range between 0 K–64 K. This module is the only one that can access the program memory between 60 K–64 K. All program read sequences in this address range automatically select the master program module 5. The company program modules 4a–4n cannot utilize the memory range of 60 K–64 K since programs in the master program module 5 that can be addressed by every company program module are located in this address space. By means of read operation accessing the company program modules, the software of the master program module can determine whether a plug-in location 3 is occupied or not occupied. The software for this read operation must be located in the master program module in the address space of 60 K–64 K. Subsequently, all company names that must be deposited in their respective company program modules 4a–4n at defined memory addresses are displayed at the LC display 6. The hearing aid acoustician now has the possibility of choosing the company by cursor keys and selecting the desired company program module with an ENTER key.

The master program module 5, which is plugged into location 2, has to fulfill various tasks. It reads the plug-in locations 3 and determines which company program modules 4a–4n are present. It displays the existing company program modules 4a–4n with corresponding company name at the LC display 6. It provides user guidance for the module selection at the LC display. The master program module 5 also starts the software of the selected company program module. It deactivates a company module when its use is no longer desired by pressing an EXIT key and returns to the company module selection. Further, a module-internal EPROM switching for expanding the program memory from 60 kB to 120 kB is possible.

The programming device also includes a battery-buffered RAMs having a capacity of 32 K bytes each and at least 1 EEPROM 8 kB. Since every hearing aid manufacturer must store his own, individual SETUP's, a 1 K byte area is assigned to every manufacturer according to its company name. A hardware interlock prevents a company from accessing the data of another company. The memory assignment is administered by the software of the master program.

The programming device of the present invention can be used to select the company program module. The company names are first found by the master program module 5 are shown on the LC display 6. The company that is currently selected with the cursor is shown at the display in inverse letters. By pressing the cursor keys, the user can now select the desired company and can start the software of the selected company module by pressing the ENTER key.

The programming device can be used to select a particular hearing aid. The desired hearing aid type can be selected by pressing the cursor keys. The presently selected hearing aid type appears at the display 6, for example, in inverse letters. The software for programming the selected hearing aid is started by means of the ENTER key.

In order to program the hearing aids, the parameter to be programmed is selected by pressing the cursor keys. The parameter text then appears at the display in inverse letters. The numerical value of the parameter can be modified via the keyboard 13. The transmission curve is updated with every change of a numerical value. The parameter to be programmed for the Automatic Gain Control setting can likewise be selected by pressing the cursor keys. A corresponding text appears at the display. The numerical value of the parameter can be incremented or deincremented via keys of the foil keyboard 13. The threshold point of the Automatic Gain Control is graphically displayed for every channel of a multi-channel hearing aid and is updated with every change of numerical value.

The block circuit diagram include a hearing aid interface 7, a write-read memory 8, a plug-in location 9 for a write-read memory 8, a RAM by 10 and an additional RAM by 11.

Figure 3:
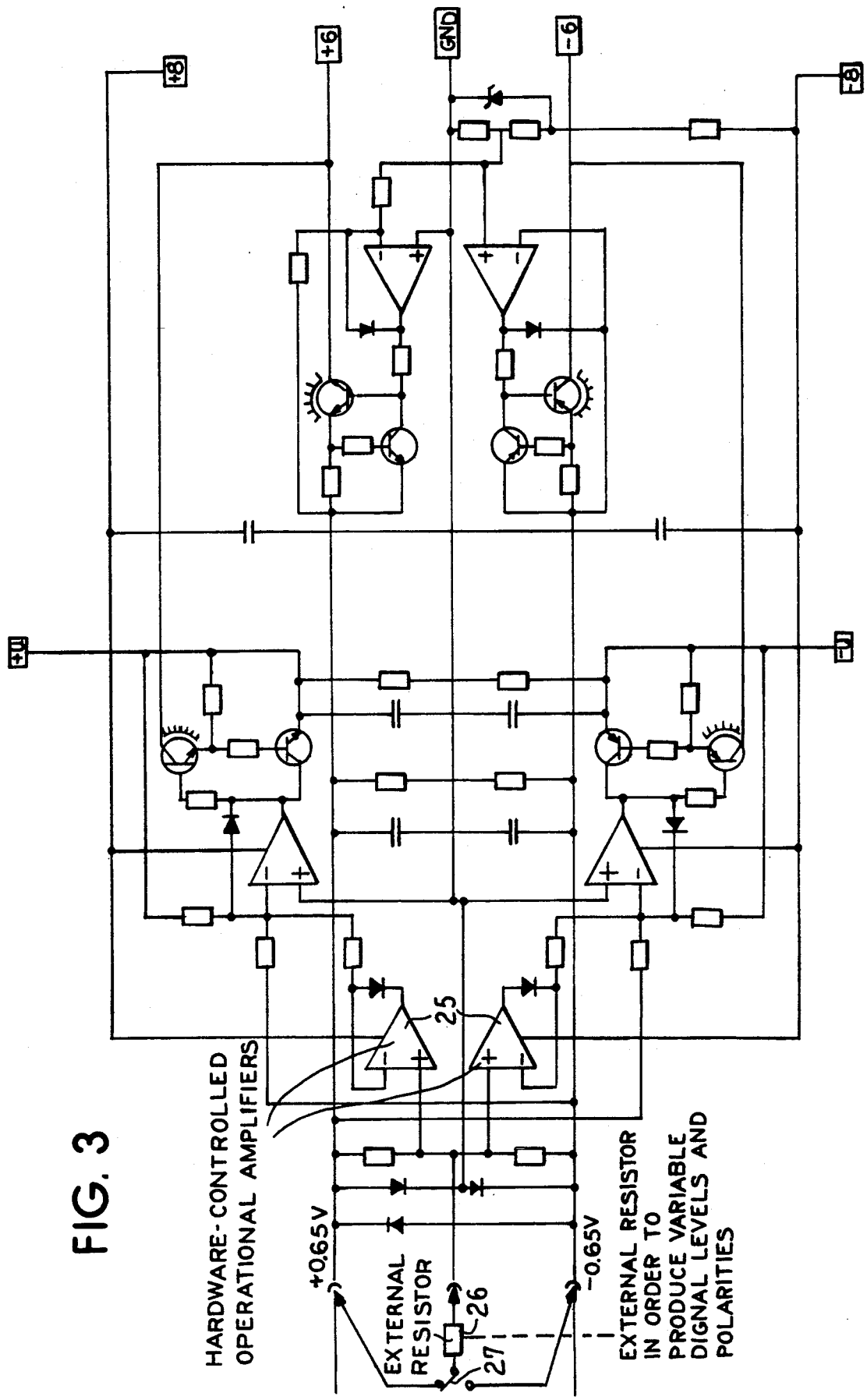
FIG. 3 is a circuit schematic showing analog switches and associated circuitry for binaural control of the hearing aid of FIGS. 1 and 2.
Figure 4A:
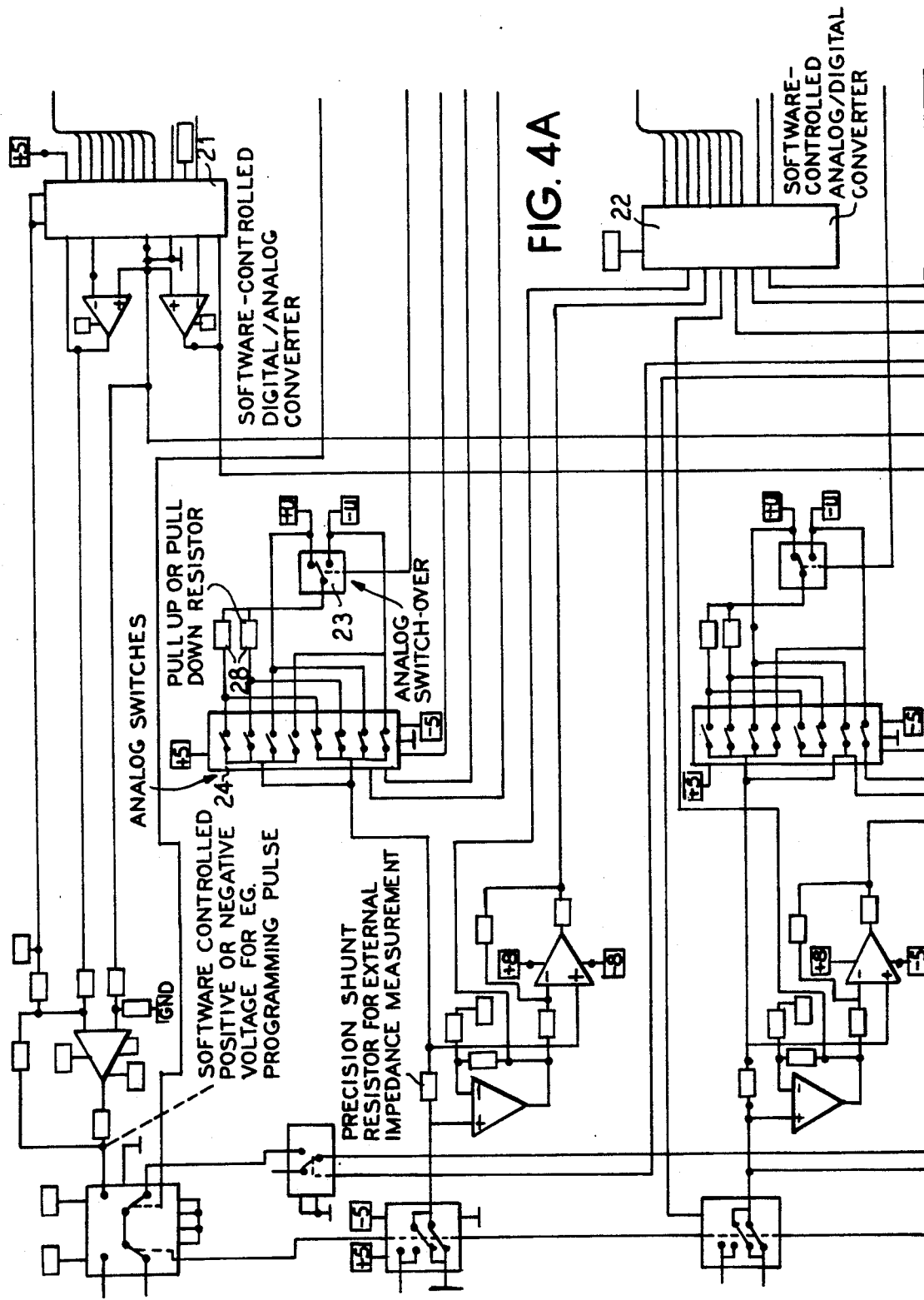

As shown in FIGS. 3 and 4A–4B, the interfaces 12, 14 and 15 contain opto-couplers and separate power supplies so the safety regulations for medical equipment can be met if standard personal computers and printers are connected.

Figure 1:
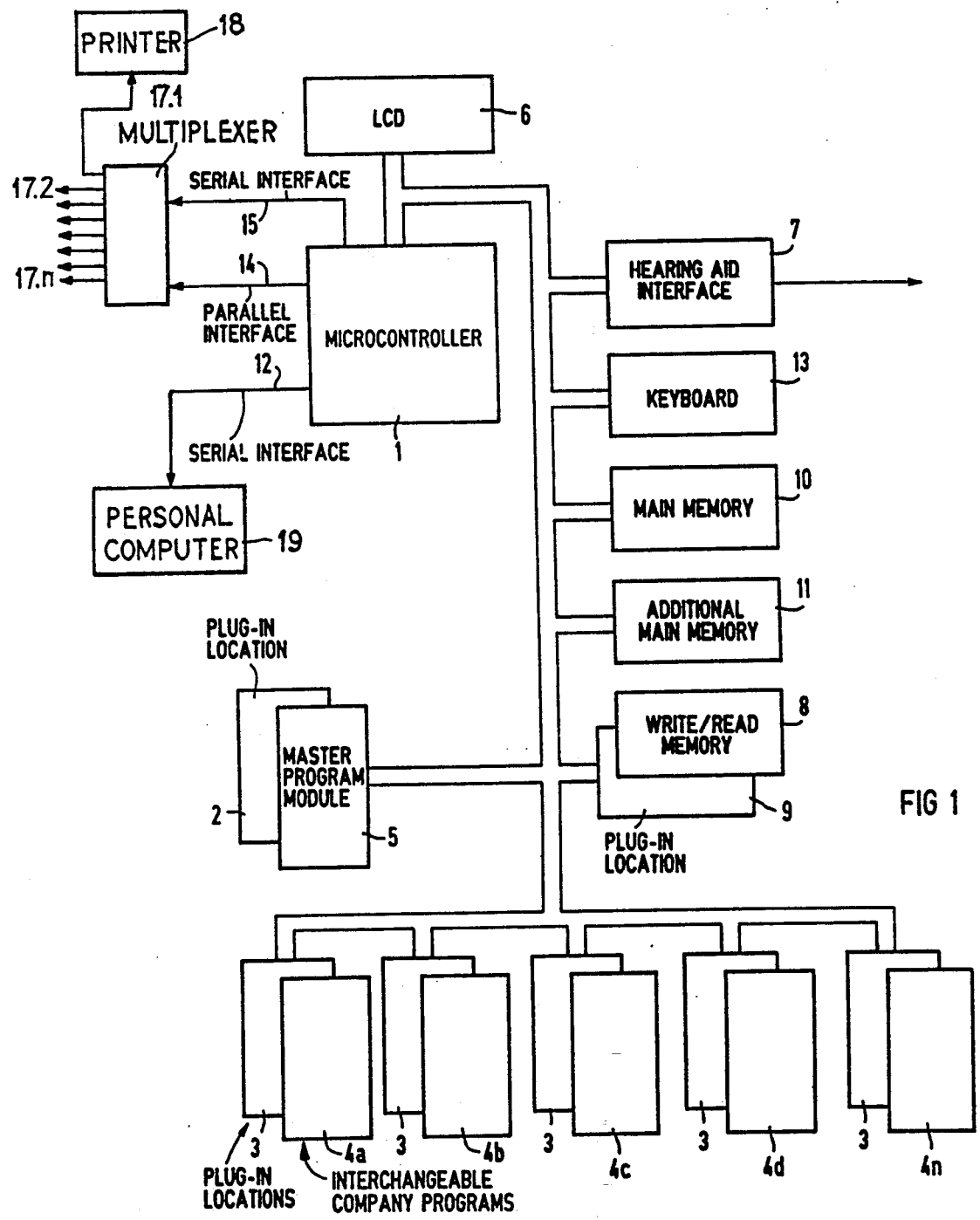
FIG. 1 is a block circuit diagram of the programming device of the invention.

FIG. 3 is a detailed circuit diagram showing an analog switch 27 and associated circuitry for binaural control of the hearing aid of FIGS. 1 and 2. The switch 27 is connected to an external resistor 26, which produces a selected digital level of polarity. The other side of the external resistor 26 is connected to the non-inverting inputs of hardware-controlled operational amplifiers 25, which respectively form a part of the signal processing circuitry in each channel in FIG. 3.

Details of the interface unit are shown in the circuit diagrams of FIGS. 4A and 4B. These include a software-controlled digital-to-analog converter 21 which produces variable signal levels. A software-controlled analog-to-digital converter 22 si used to determine the external impedance. A software-controlled switch-over 24 is used to adjust the half-duplex of full-duplex mode. A software-controlled analog switch-over 23 is also provided to connect and disconnect pull-up or pull-down resistors. These resistors function as pull-up or pull-down resistors depending upon the switch position of switch-over 23.

Although modifications and changes may be suggested by those skilled in the art, it is the intention of the inventors to embody within the patent warranted thereon, all changes and modifications as reasonably and properly come within their contribution to the art.

We claim as our invention:

1. A digital programming device for programming a plurality of different hearing aids comprising:
    a plurality of module plug-in locations each adapted to receive one of a plurality of interchangeable manufacturer program modules each manufacturer program module having characteristics stored therein for setting a hearing aid uniquely associated with said manufacturer program module;
    a master program module having a program stored therein for identifying one or more manufacturer program modules in said module plug-in locations;
    control means connected to each of said plug-in location can to said master program module for conducting a read operation, using said program in said master program module, of said module plug-in location thereby identifying which module plug-in locations are respectively occupied by which manufacturer program modules;
    hearing aid interface means connected to said module plug-in locations and to said control means and adapted for connection to a hearing aid to be set for supplying the characteristics from one of said manufacturer program modules to the hearing aid;
    said hearing aid interface means consisting of software-controlled digital-to-analog converter means for producing variable signal levels, software-controlled analog-to-digital converter means for determining external impedance, software-controlled analog switch-over means for adjusting the half- or full-duplex mode, software-controlled analog switch means for connecting or disconnecting different pull-up or pull-down resistors, and hardware-controlled operational amplifiers connected to an external resistor to produce variable signal levels and polarities; and
    means connected to said control means for selecting a manufacturer program module uniquely associated with said hearing aid and thereby connecting said hearing aid to said program module uniquely associated therewith via said hearing aid interface means.

2. A digital programming device as claimed in claim 1, further comprising a means connected to said control means for displaying a manufacturing company and hearing aid type of said hearing aid.

3. A digital programming device as claimed in claim 2, wherein said means for displaying further indicates read operation information by said master program module of said company modules.

4. A digital programming device as claimed in claim 3, wherein said means for displaying is a graphic display panel.

5. A digital programming device as claimed in claim 1, further comprising a main memory means connected to said plurality of plug-in locations, said master program module, and said control means for storing hearing aid adjustments of said hearing aid.

6. A digital programming device as claimed in claim 1, further comprising:
    an interchangeable nonvolatile write/read memory for storing characteristics of said hearing aid; and
    a plug-in location in said digital programming device for receiving said nonvolatile write/read memory means.

7. A digital programming device as claimed in claim 6, further comprising:
    a plurality of sub-memories in said nonvolatile write/read memory, each of said sub-memories being allocated to one of said company program modules; and
    means for connecting said master program module means to said nonvolatile write/read memory means so as to confine access of said company program modules to said allocated sub-memories.

8. A digital programming device as claimed in claim 1, further comprising:
    means for storing a plurality of settable basic hearing aid parameters for fine-tuning said hearing aid; and
    means for storing a plurality of settable individual requirement hearing aid parameters for fine-tuning said hearing aid.

9. A digital programming device as claimed in claim 8, wherein said parameters are set by a personal computer connected to said digital programming device; said parameters are transferred to a printer via a standard interface.

10. A digital programming device as claimed in claim 1, further comprising:
    a switch-over means for binaural fitting.

* * * * *